United States Patent [19]

Kramer

[11] Patent Number: 5,385,054
[45] Date of Patent: Jan. 31, 1995

[54] FASTENER TENSION MONITOR

[76] Inventor: Hy Kramer, 50 Carter Dr., Stanford, Conn. 06902

[21] Appl. No.: 107,283

[22] Filed: Aug. 16, 1993

[51] Int. Cl.⁶ .................................... F16B 31/02
[52] U.S. Cl. ............................. 73/761; 411/10
[58] Field of Search .......... 73/761, 774, 862.02, 73/775, 768; 411/10

[56] References Cited

U.S. PATENT DOCUMENTS

| | | | |
|---|---|---|---|
| 3,469,492 | 7/1967 | Dahl | 73/761 |
| 4,131,050 | 12/1978 | Holmes | 411/11 |
| 4,164,164 | 8/1979 | Trungold | 85/62 |
| 4,303,001 | 12/1981 | Trungold | 411/10 |
| 4,773,272 | 9/1988 | Trungold | 73/761 |
| 5,199,835 | 8/1993 | Turner | 411/11 |

FOREIGN PATENT DOCUMENTS 1311994 12/1992 Canada .

*Primary Examiner*—Thomas P. Noland
*Assistant Examiner*—James M. Olsen
*Attorney, Agent, or Firm*—Robert M. Phipps

[57] ABSTRACT

A device to monitor tension in a fastener assembly such as a stationary bolt and a moveable nut for securing elements therebetween. The device is in the form of a washer for use in the assembly between the nut and the elements or the bolt head and the elements. In one example, a slot is provided in the surface of the washer and extends radially outwardly from the inner periphery thereof. A recess is formed in the bottom of the slot, creating at least one fulcrum point in the slot. A monitor and indicating strip, for example a spring steel, is located in the slot and, under tension from one of the fastener assembly members, the distal end of the strip rises from the slot to provide a visual and measurable monitor of tension in the assembly. In another example, the monitor strip is located on the surface of the washer and the fulcrum is located on one of the fastener elements, such as on the underside of the nut, for engaging the strip under pressure, causing its distal end to rise.

29 Claims, 8 Drawing Sheets

FASTENER TENSION MONITOR

FIELD OF THE INVENTION

This invention relates to fastener assemblies and, in particular, to a device to monitor tension in fastener assemblies.

BACKGROUND OF THE INVENTION

There are many applications for the use of high tensile strength bolts, such as in bridgework, steel building structures and the aircraft industry, to name a few. In such structures, the maintenance of proper bolt tension is most important. Obviously, if bolt tension is insufficient or below requirements in any way, the joint secured by the bolt will be substandard in the strength that is desired. Also, if a bolt is over stressed, there is always a possibility of failure in the joint of the fastener assembly.

In many applications using high tensile strength bolts in fastener assemblies, it is important to maintain a desired bolt tension throughout the life of the fastener assembly. Thus, it is desirable to frequently or periodically monitor the tension of the fastener assembly.

One form of monitoring bolt tension is set out in U.S. Pat. No. 4,773,272, Trungold, issued Sep. 27, 1988 as well in a corresponding Canadian Patent 1,311,944 of Dec. 29, 1992.

The present invention sets forth improvements in the art such as the Trungold disclosures.

SUMMARY OF THE INVENTION

The present invention discloses a device to monitor tension in the members of a fastener assembly such as a stationary bolt and a movable nut for securing structural elements or the like therebetween. The device comprises a washer for location in the assembly between either the nut and the structural elements or between the bolt head and the structural elements. In one embodiment a slot is formed in the surface of the washer and extends radially outwardly from the inner periphery thereof to the outer periphery thereof. A recess is provided in the bottom of the slot and this forms at least one fulcrum point in the slot between the bottom of the recess and the bottom of the slot. An indicator or monitor strip, preferably but not necessarily spring steel, is located in the slot such that a portion of the length of the strip is located under a member of the fastener assembly so that, under predetermined tension from one of the fastener assembly members, the distal end of the strip rises from the slot to provide a visual and measurable monitor of tension in the fastener assembly.

In another embodiment there is no slot and recess in the washer, the indicator strip being located on the surface of the washer. The fulcrum is in the form of a rib on one of the fastener elements, such as the moveable nut, for engaging the strip under pressure causing its distal end to rise.

In the examples to be illustrated, the slot has both inner and outer fulcrum points at junctions between the bottom of the slot and end wall portions of the recess therein, although single fulcrum slots can be used.

In a preferred form of the invention, the indicator strip is an elongated, rectangular leaf spring located in the slot in the surface of the washer so that the inner or proximal end of the strip comes under load of a bolt head or nut in the fastener assembly and, in doing so, the tension that is applied to the adjacent assembly member moves a portion of the strip into the recess of the slot, thereby pivoting the distal end of the strip upwardly from the slot. This provides both a visual and a measurable monitor of tension in the assembly.

The degree of elevation of rise of the strip, or the height thereof from the slot, provides a basis for measuring the elevation at different intervals by formulating a graph in relationship to the movement of the strip at different elevations, caused by different pressures when applying force raises the strip from the slot. This is a substantially different form of measurement than that set out in U.S. Pat. No. 4,773,272 which utilizes an instrument to measure the pressure of the strip back to zero.

It will be appreciated that the thickness of the strip, the size thereof, the configuration of it and the type of material used in the strip, for example stainless steel, will alter and change conditions.

The upper surface of the monitor strip is coplanar or nearly so with the surface of the washer in which the slot is formed or the upper surface of the monitor strip can be slightly above (approximately a thousandth of an inch) the surface of the washer. In a preferred form of manufacture, the slot and its associated recess are formed in the surface of the washer in a stamping process and the monitor strip is then located in the slot. The strip can be provided separately with the washer but preferably it is secured in the slot, preferably at or adjacent the proximal end thereof to a desired point in the slot and is so secured by adhesive, coining or spot welding.

The monitor strip is preferably but not necessarily the same length as the slot. It can be located so that it extends from the inner to the outer peripheral edges of the washer, i.e. the full length of the slot, or it may be located outwardly somewhat so that the inner end of the strip will be moved outwardly of the innermost end of the slot and the outermost end of the strip will project somewhat from the outer periphery of the washer.

According to one broad aspect, the invention relates to a device to monitor tension in the members of a fastener assembly such as a stationary bolt and a moveable nut for securing structural elements or the like therebetween. The device comprises a washer for location in the assembly between the nut and the elements or between the bolt head and the elements. A slot formed in the surface of the washer extends radially outwardly from the inner periphery thereof and a recess provided in the bottom of the slot forms at least one fulcrum point in the slot between the bottom of the recess and the bottom of the slot. A monitor strip is located in the slot such that a portion of the length of the strip is located under a member of said fastener assembly so that, under predetermined tension from one of the fastener assembly members, the distal end of the strip rises from the slot to provide a visual and measurable monitor of tension in the assembly.

According to a further aspect, the invention relates to a device for use in a fastener assembly to monitor tension therein, the fastener assembly being of the type including a stationary member such as a bolt and a moveable member such as a nut threadably engaging the bolt for securing structural elements or the like between said nut and bolt. The tension monitoring device comprises a washer for location in the fastener assembly between either the stationary bolt or the moveable nut and the structural elements. A radially extending slot is formed in one surface of the washer and extends substantially the surface of the washer from the inner to the outer periphery thereof. A recess in the bottom of the slot has end surfaces the upper ends of which meet the bottom surface of said slot to form a fulcrum point at the junction between the slot bottom and said end surfaces. A monitor strip is located in said slot such that the distal end, at least, of the strip sits freely in said slot whereby, when sufficient tension between the adjacent fastener member and the structural element is applied, a portion of said strip will be forced into said recess and the strip will pivot about the fulcrum so that the distal end of the strip will rise from the slot to provide a visual display of the tension.

According to a still further aspect, the invention relates to a device for use in a fastener assembly to monitor tension therein, the fastener assembly being of the type including a stationary member such as a bolt and a moveable member such as a nut threadably engaging the bolt for securing structural elements or the like between the nut and bolt. The tension monitoring device comprises a flat washer for location in the fastener assembly between either the stationary bolt or the moveable nut and the structural elements. A radially extending slot of rectangular cross-section is formed in one surface of said washer and extends substantially the surface of the washer from the inner to the outer periphery thereof and a recess of rectangular cross-section in the bottom of the slot has end surfaces the upper ends of which meet the bottom surface of said slot to form a fulcrum point at the junction between the slot bottom and the end surfaces. A monitor metal strip is located in the slot and is secured, at a selected point along its length, to the slot such that the distal end, at least, of the strip sits freely in the slot whereby, when sufficient tension between the adjacent fastener member and the structural element is applied, a portion of the strip in said slot will be forced into the recess and the strip will pivot about the fulcrum so that the distal end of the strip will rise from the slot to provide a visual display of the tension.

In still another embodiment of the invention there is provided a device to monitor tension in the members of a fastener assembly such as a stationary member and a moveable member for securing structural elements or the like therebetween, said device comprising a washer for location in the assembly between the moveable member and the elements or between the stationary member and the elements; a tension monitor strip located on the surface of said washer such that a portion of the length of the strip is positioned under one of said members; and a fulcrum on said one of said members for engaging said strip so that, under pressure from the fulcrum on said one of said members, the distal end of said strip will rise to provide an indication of tension in said assembly.

BRIEF DESCRIPTION OF THE DRAWINGS

The invention is illustrated by way of example only in the accompanying drawings in which.

DETAILED DESCRIPTION OF THE PREFERRED EMBODIMENT

By way of illustration, the monitoring device of the present invention is shown in a fastener assembly utilizing a stationary member in the form of a bolt and a movable member in the form of a nut. The device according to the invention is illustrated as being positioned between the nut or movable member and structural element. It will however be appreciated that the washer could also be located between the underside of the bolt head and structural assemblies or in both locations.

Figure 1:
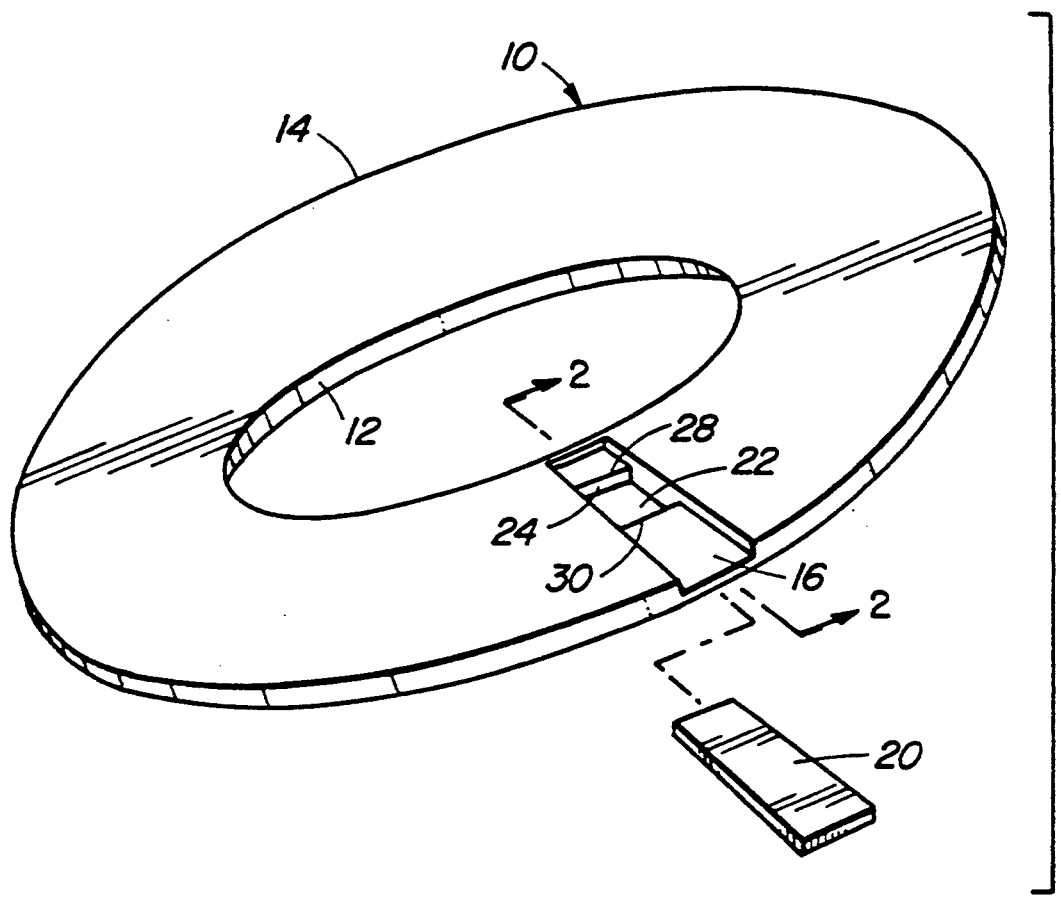
FIG. 1 is a perspective view of a flat steel washer with slot means according to the invention.
Figure 2:
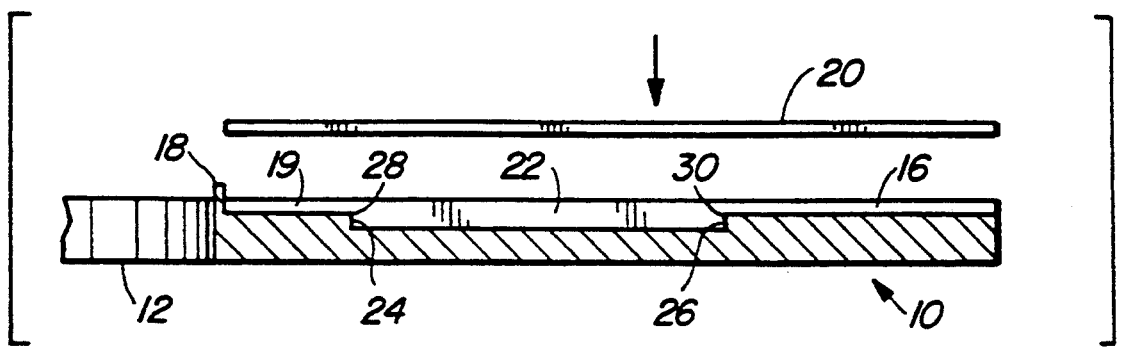
FIG. 2 is a cross-section as seen along the lines 2—2 of FIG. 1 and showing one location for a monitor strip in the slot means.
Figure 3:
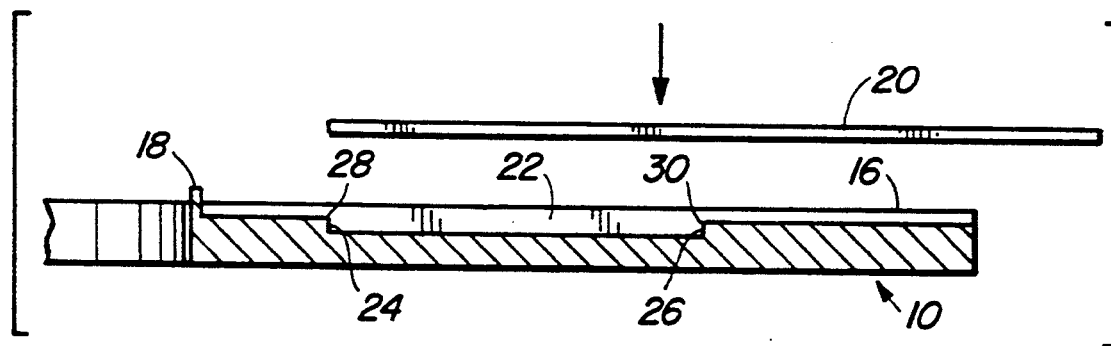
FIG. 3 is a cross-sectional view similar to FIG. 2 but showing a further location for a monitor strip in the slot means.

Looking initially at FIGS. 1-3, a fastener tension monitoring device according to the invention comprises a flat washer 10, preferably made from high tensile strength steel and, like all flat washers, it has an inner periphery 12 and an outer periphery 14. The surface of the washer 10 is provided with a slot 16 which extends substantially throughout the width of the washer from the inner periphery 12 to the outer periphery 14 thereof. The slot 16 can be formed in the washer in many ways such as machining or the like but preferably it is formed in a stamping operation. As shown in FIGS. 2 and 3, the inner end of the slot 16 would probably though not necessarily have a small upright tab 18 at the inner end thereof and this would be formed during the stamping operation by means of a mandrel (not shown) located in the central aperture of the washer. The provision of the tab 18 provides a form of locating means for the insertion of the monitor strip 20 and prevents the strip from entering the area of the central aperture in the washer. The radially extending slot 16 has a recess 22 formed therein and while this recess may take several shapes, preferably it is rectangular as illustrated and is formed in the same stamping operation that forms the slot 16. Recess 22, because it is deeper than slot 16, is provided with inner and outer end walls 24, 26 and the existence of these end walls in turn forms two, inner and outer fulcrum points 28, 30 respectively as will be described further on, these fulcrum points provide locations for pivotal movement of the monitor strip 20 in the slot 16.

The monitor strip 20, for purposes of clarity, is illustrated in FIG. 1 as being removed from the slot 16 but it will be observed that the strip is, in its preferred form, an elongated, rectangular metal strip, which fits into the slot 16 where the upper surface of the strip 20 is coplanar, or nearly so, with the upper surface of the washer 10. The strip 20 may also be slightly above the surface of the washer, possibly a thousand of an inch. The strip 20 will function in its role if it is freely set in the slot, but preferably it is secured therein either by coining, adhesive or by spot welding at a desired point along its length. The location of the securement will depend on some extent on whether the strip 20 is located in the slot to the full extent thereof as shown in FIG. 2 or only partially so as shown in FIG. 3. Suffice it to say however that, if the strip 20 is inserted full length in the slot 16 so that its inner end rests against the tab 18 as shown in FIG. 5, then the securement would probably be somewhere in the innermost part of the slot 16 such as at location 19 in FIG. 2.

It will be observed that placing the monitor strip 20 into the slot 16 in accordance with the downward movement shown in FIG. 2 and having secured in the slot at location 19, the proximal end of the strip 20 will be located adjacent the central aperture of the washer 10 (or adjacent the bolt in FIG. 5) and the remainder of the strip 20 will lie freely in the slot and over the recess 22, the distal end of the strip 20 being positioned adjacent the outer periphery 14 of the washer.

Figure 4:
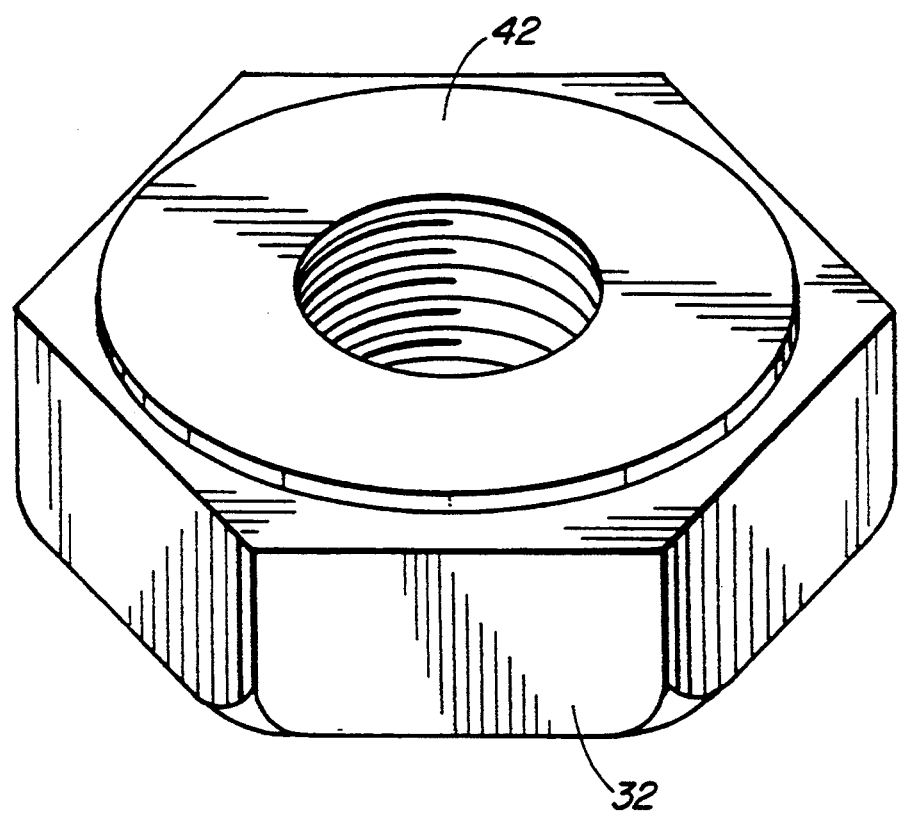
FIG. 4 is a perspective view of a standard form of nut or movable member from a high tensile fastener assembly.
Figure 5:
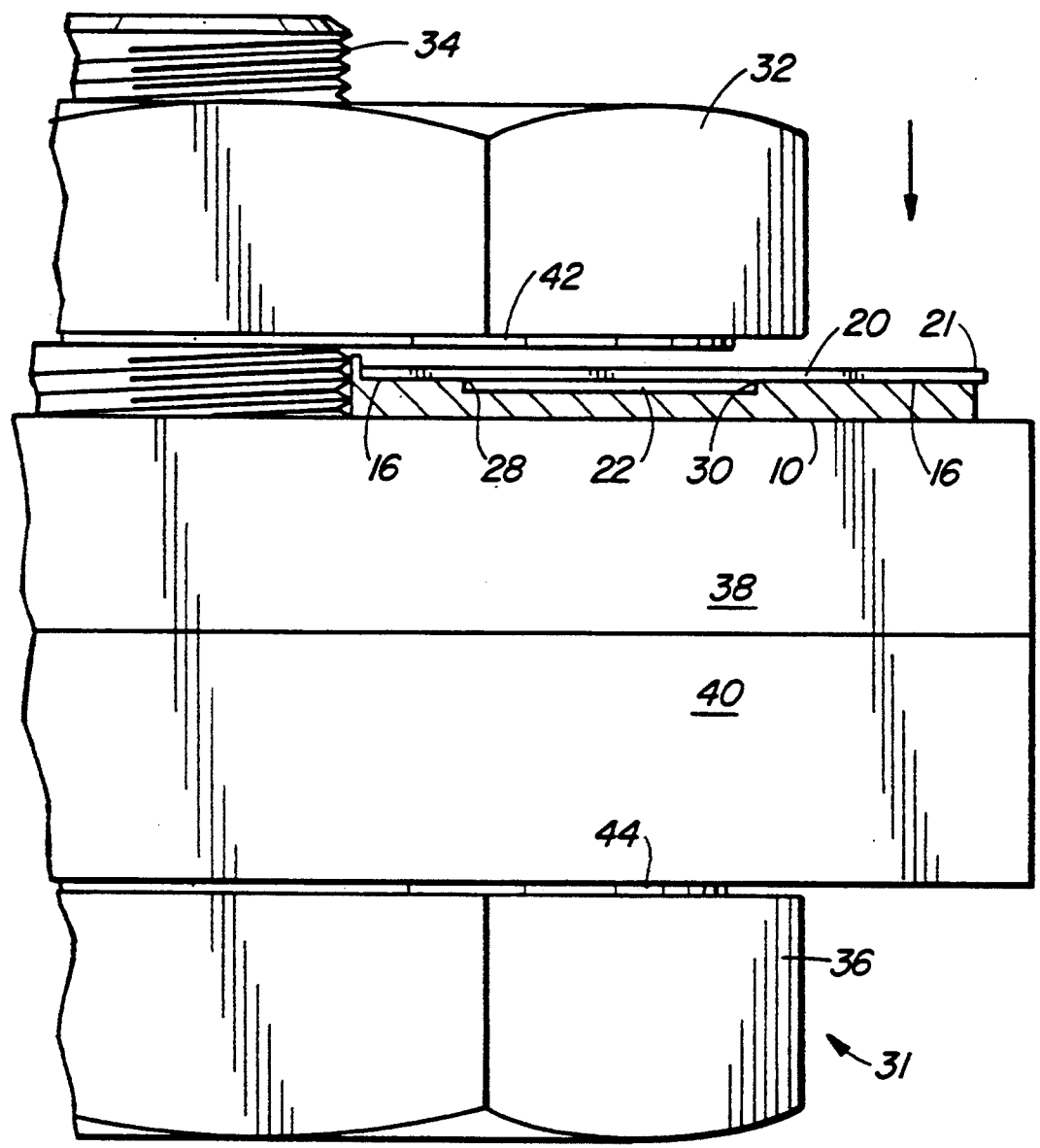
FIG. 5 is a fragmentary view, partly in section, of a fastener assembly, partly in section, showing the location of a device according to the present invention prior to pressure being applied thereto.

Referring to FIGS. 4 and 5, a fastener element illustrated generally at 31 incorporates a movable member or nut 32 threadably engaging a bolt 34 having a head 36 and between the stationary and movable members, they are securing a pair of structural elements 38 and 40 therebetween.

As shown in FIG. 4, the underside of the nut 32 may be flat and planar but it probably would be of a conventional form having an integrally formed washer portion 42 as illustrated. Similarly, the underside of the head 36 of the bolt 34 also has an integrally formed washer surface 44, as is common in high tensile strength fasteners.

FIG. 5 shows the slotted washer 10 of the present invention in cross-section and in an inoperative position under the nut 32 which is in an un-torqued position but to place it in an operative position, it will be tightened downward in the direction of the arrow to fully engage the surface of washer 10 and the monitor strip 20 lying in the slot 16.

Figure 6:
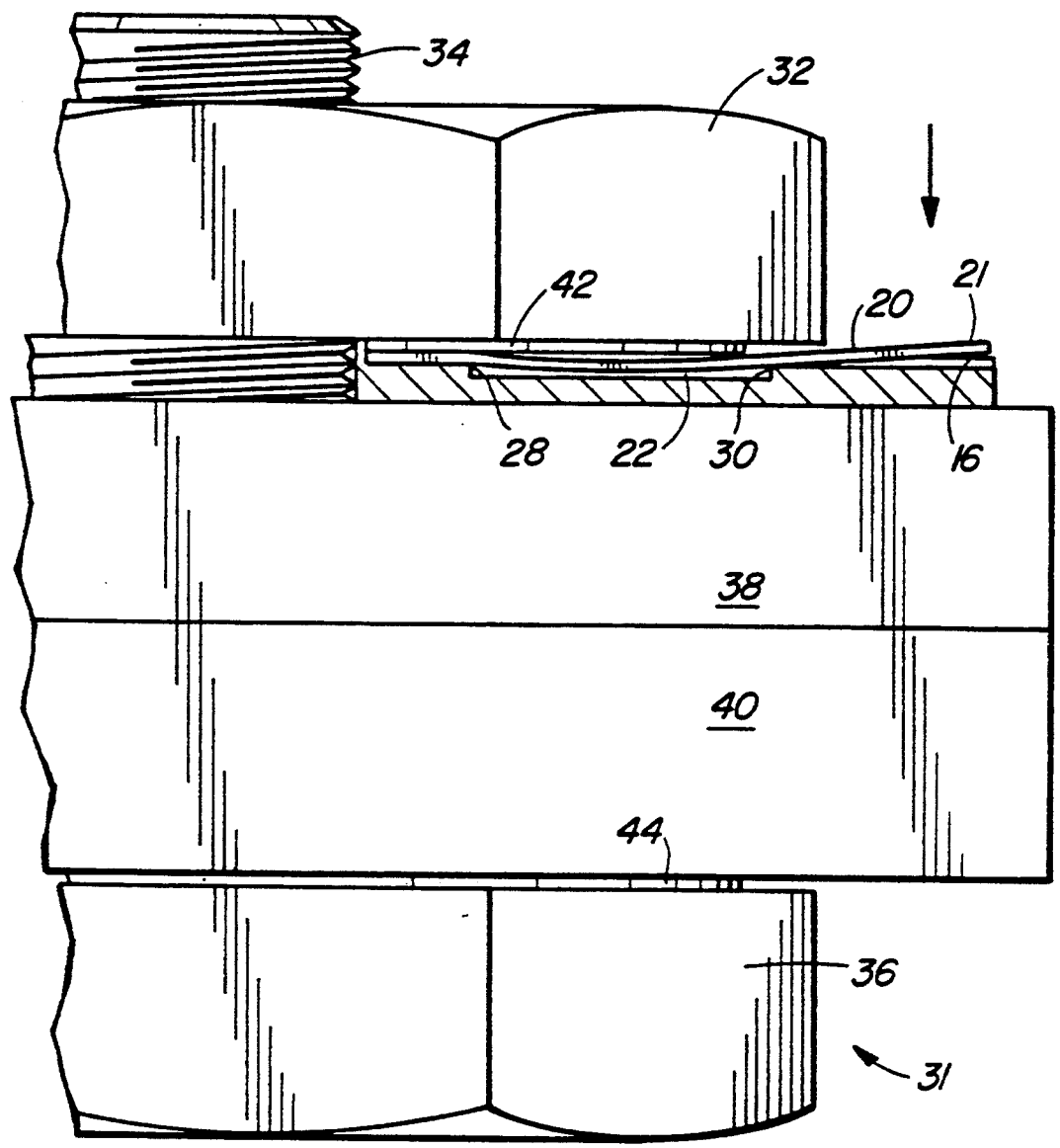
FIG. 6 is a view similar to FIG. 5 but showing the nut being tightened on the bolt and applying tension thereto and illustrating the monitoring device in an operative position when it is located in accordance with FIG. 2.
Figure 7:
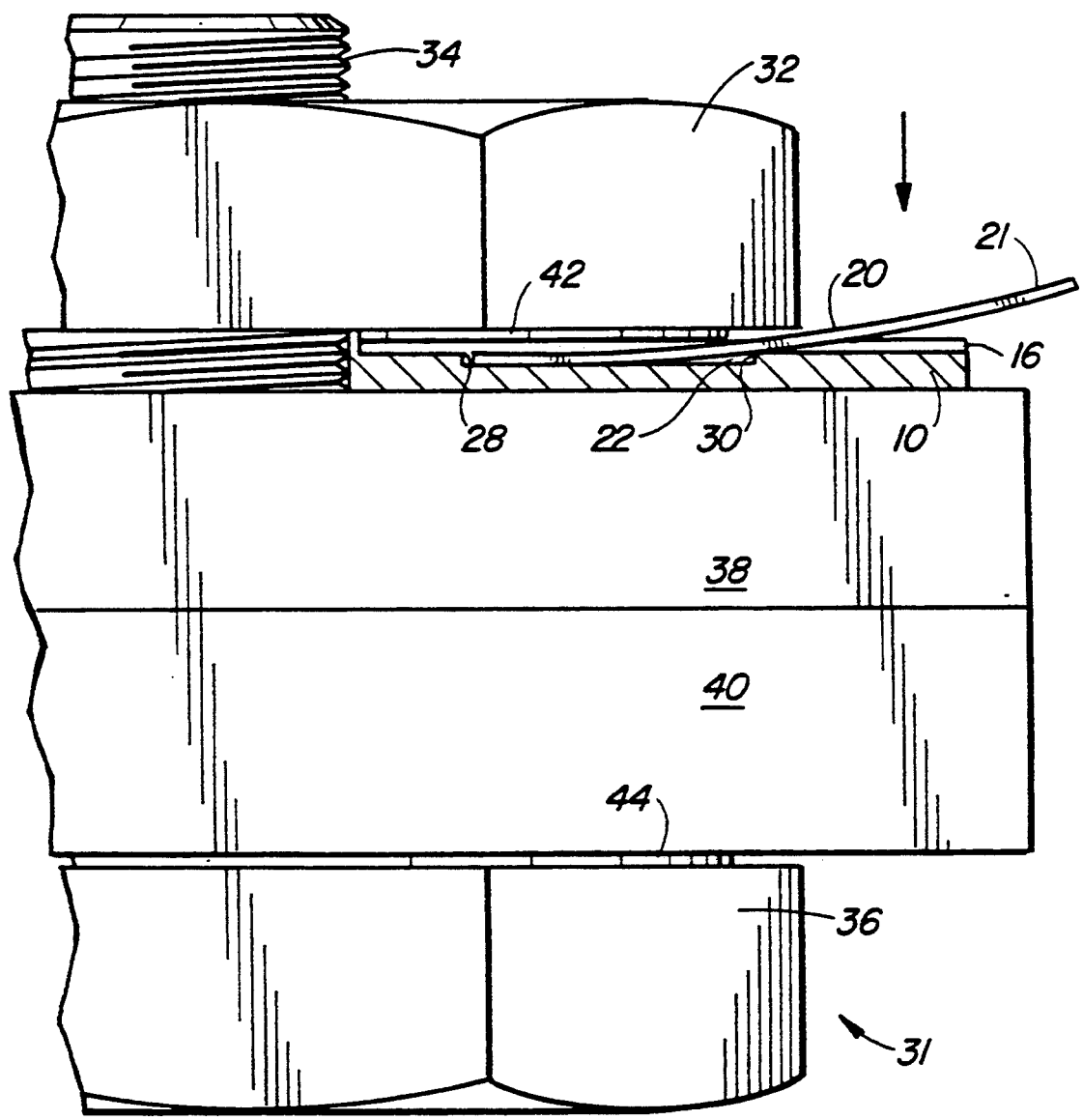
FIG. 7 is a view similar to FIG. 6 but showing the monitoring device in an operative position when located in accordance with FIG. 3.

FIGS. 6 and 7 are views similar to FIG. 5 but FIG. 6 illustrates the operative position of the strip 20 when tension is applied to the bolt 34 by downward pressure of the nut 32, with the strip remaining in the position of FIG. 5 i.e. being located in the full length of the slot 16.

FIG. 7 shows the operative position of the strip 20 when the strip is located outwardly in the slot as shown in the earlier description of FIG. 3.

Referring to FIGS. 5 and 6, it will be appreciated that as the nut 32 is turned down on the bolt 34 the integral washer-like surface 42 on the underside of the nut 32 will initially engage the surface of the washer 10 and the upper surface of the strip 20. It should be pointed out however that in an arrangement where the movable member or nut does not have an integral washer surface 42, the flat underside of the nut 32 will effect the same results on the washer 10 and strip 20.

FIG. 6 illustrates the fastener assembly 31 with the movable member or nut 32 tightened down on the bolt 34 to apply tension thereto. In so doing, the surface pressure from the nut portion 42 against the washer 10 and strip 20, forces the central portion of the strip 20 to deflect, as shown, into the confines of the recess 22 and effecting upward movement of the distal end 21 of the strip 20 from the confines of the groove 16.

As mentioned earlier, the amount of tension applied to the fastener element 31 will determine the height or elevation of the distal end 21 of the strip and this can be measured in a variety of ways to provide a monitor over a period of time indicating an increase or decrease in the tension of the assembly.

FIG. 7 is a similar arrangement to FIG. 6 but shows the strip 20 in an operative position when the strip is initially located outwardly in the slot 16 in accordance with FIG. 3. In this arrangement, deflection or upward movement of the distal end 21 of the strip may be more pronounced depending on the length of the strip 20 originally used in the assembly.

It will be observed in FIG. 6 that, due to the downward pressure of the underside of the nut 32 the monitor strip 20 has a portion of its length deflected downwardly into the recess 22 and, due to the provisions of the fulcrum points 28 and 30, the deflection pivots the strip 20 about those fulcrum points to raise the distal end 21.

In the arrangement of FIG. 7, only the outer fulcrum 30 is utilized as the inner end of the strip 20 is outwardly of the innermost fulcrum 28.

Figure 8:
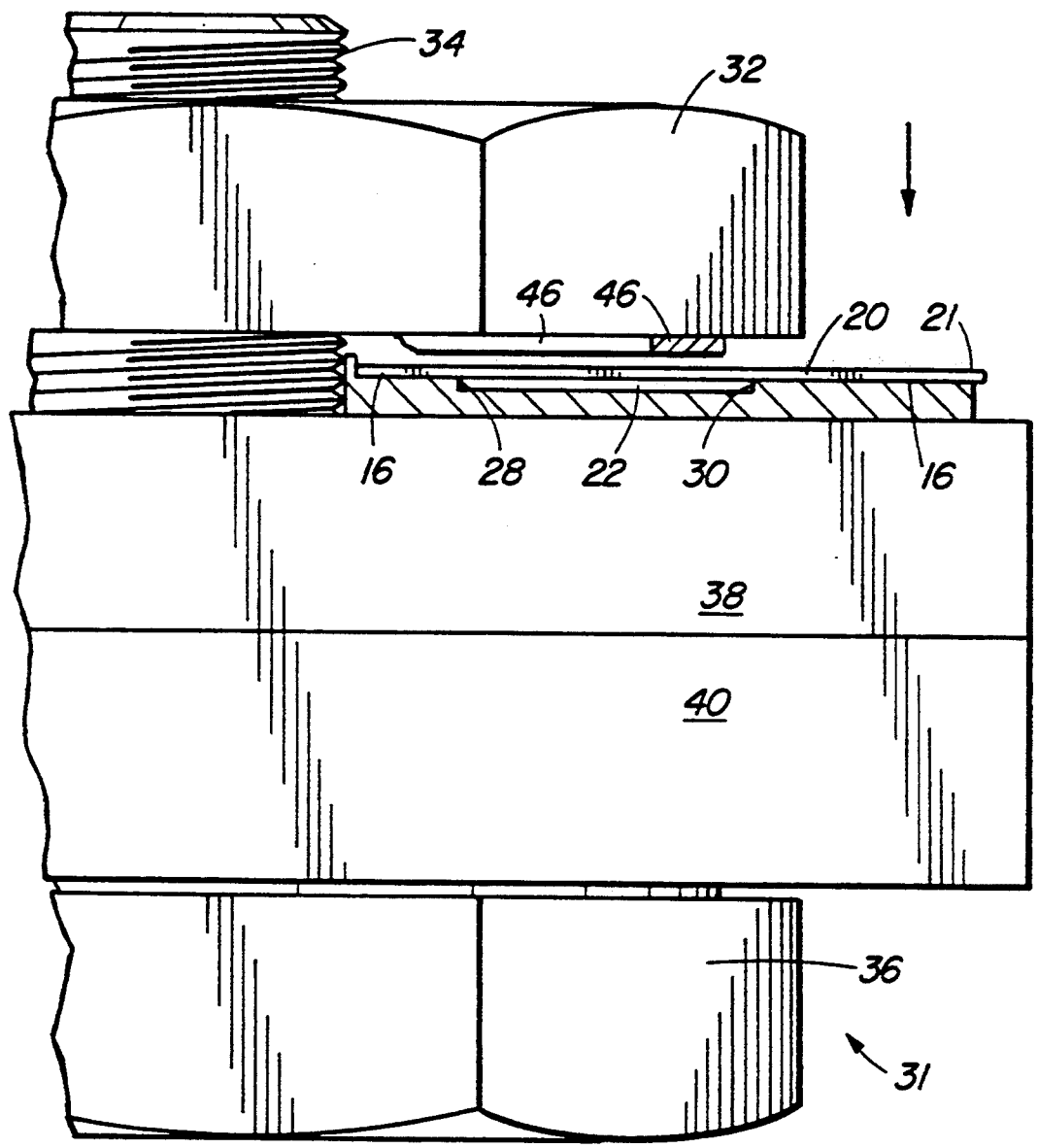
FIG. 8 is a view similar to FIGS. 6 and 7 but showing an alternate form of nut or movable member in the assembly.

Another embodiment of the invention is shown in FIG. 8 where the underside of the nut 32 is provided with a circular bead or rib 46 rather than integral washer-like surface. Rib 46 might be rectangular in cross-section as shown in FIG. 8 or it could be a convex, semicircular configuration. In either of them, it would cooperate with the recess 22 in the bottom of the slot 16 in washer 10 to effect the upward lodgment of the distal and 21 of the strip 20, when sufficient tension would be applied to the bolt 34.

From the point of visual enhancement, the monitor strip 20 could be provided with some form of colouring.

It will be appreciated that the invention may take other shapes and forms beyond those illustrated. For example, another embodiment utilizing a slotted washer would not require the recess 22 but a combination of a soft washer with a slot 16 and a strip 20 therein operating with a nut 32 having a rib 46 on the underside thereof would effect upward movement of the strip. In this arrangement, the washer would be softer than the nut and the monitor strip 20 would be hard.

Figure 9:
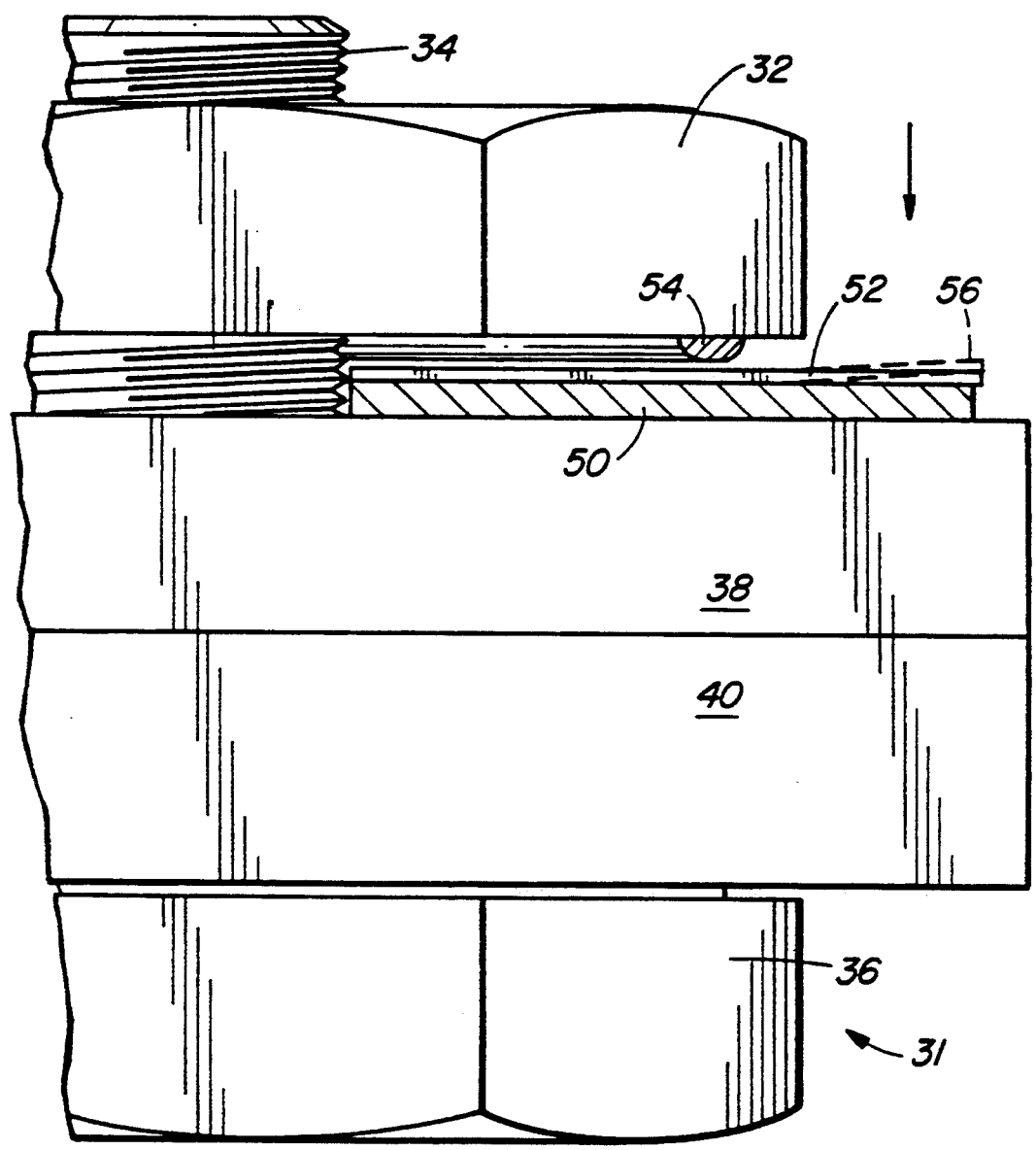
FIG. 9 is a view similar to FIG. 8 but showing a further embodiment of the invention.

A further embodiment of the invention is illustrated in FIG. 9. In this arrangement, the fulcrum for actuating the monitor or indicating strip is located on one of the elements of the fastener assembly, in this case on the nut 32 although it could be incorporated with the bolt head 36.

In the illustrated example a washer 50 is not, in this case, provided with a slot but, instead, a monitor strip 52 is located on the surface of the washer.

The moveable member or nut 32 has a rib 54 (which constitutes the fulcrum) on its underside (similar to FIG. 8) and this rib could be of any suitable cross-section such as convex or semi-circular as shown. Rib 54 would be the harder of the materials in the arrangement so that, when the nut 32 is turned down on the bolt 34 and the rib 54 engages the strip 52 and applies pressure to it, the distal end 56 of the strip will rise, as shown in pecked line, to perform its indicating and monitoring function.

It will be appreciated that while the washers illustrated in the arrangements herein for the purpose of example are shown as flat and round, other configurations of washers such as hexagonal, square, etc. will function in the invention.

Moreover, while the slots in the washers as illustrated are shown as being rectangular in cross-section, other cross-sectional configurations, such as concave or semi-circular are within the realm of the invention.

Also, the illustrated recesses in the slots are shown as rectangular with a fulcrum (such as 28 and 30). But other recess configurations are possible and functional, such as a sloping recess with only one fulcrum point.

The monitor strips according to the invention are preferably formed from spring steel but other types of metal or materials may be acceptable.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitations, and there is no intention in the use of such terms and expressions to exclude any equivalents of the features shown and described or portions thereof, but it is recognized that various modifications are possible within the scope of the invention claims.

I claim:

1. A device to monitor tension in the members of a fastener assembly such as a stationary bolt and a moveable nut for securing structural elements or the like there between, said device comprising a washer for location in the assembly between the nut and the elements or between the bolt head and the elements; a slot in the surface of the washer extending radially outwardly from the inner periphery thereof; a recess in the bottom of the slot forming at least one fulcrum point in the slot between the bottom of the recess and the bottom of the slot; and a monitor strip located in the slot such that a portion of the length of the strip is located under a member of said fastener assembly and over said at least on fulcrum point so that, under predetermined tension from one of the fastener assembly members and the presence of said at least one fulcrum point, the distal end of the strip rises from the slot to provide a visual and measurable monitor of tension in the assembly.

2. A device according to claim 1 wherein the washer is a flat, circular washer.

3. A device according to claim 1 wherein the slot extends substantially across the surface of the washer from the inner periphery thereof to the outer periphery thereof; said slot being rectangular in cross-section.

4. A device according to claim 1 wherein said recess is rectangular in cross-section and is substantially shorter than, but of the same width as said slot.

5. A device according to claim 1 wherein said recess has end walls normal to and adjoining the bottom of said slot to form said fulcrum point.

6. A device according to claim 1 wherein said monitor strip is metal.

7. A device according to claim 1 wherein said monitor strip is spring steel.

8. A device according to claim 1 wherein said monitor strip is secured, at a selected point along its length, in said slot.

9. A device according to claim 8 wherein the proximal end of said strip is secured in said slot.

10. A device according to claim 8 wherein the strip is secured in said slot by adhesive.

11. A device according to claim 8 wherein the strip is secured in said slot by spot welding.

12. A device according to claim 1 wherein the strip is substantially the same length as said slot.

13. A device according to claim 1 wherein the height that the distal end of the strip rises at different intervals, provides means for formulating a graph in relationship to movement of said strip at different elevations caused by different pressures when applying tension to said assembly.

14. A device according to claim 1 wherein the upper surface of said strip and the upper surface of said washer are co-planar, or nearly so.

15. A device for use in a fastener assembly to monitor tension therein, said fastener assembly being of the type including a stationary member such as a bolt and a moveable member such as a nut threadably engaging said bolt for securing structural elements or the like between said nut and bolt;

said tension monitoring device comprising:
a washer for location in said fastener assembly between either said stationary bolt or the moveable nut and said structural elements;
a radially extending slot in one surface of said washer and extending substantially the surface of the washer from the inner to the outer periphery thereof;
a recess in the bottom of the slot, said recess having end surfaces the upper ends of which meet the bottom surface of said slot to form a fulcrum point at the junction between the slot bottom and said end surfaces; and
a monitor strip located in said slot such that the distal end, at least, of the strip sits freely in said slot whereby, when sufficient tension between the adjacent fastener member and the structural element is applied, a portion of said strip will be forced into said recess and the strip will pivot about said fulcrum so that the distal end of the strip will rise from the slot to provide a visual display of said tension.

16. A device according to claim 15 wherein said washer is a flat steel washer.

17. A device according to claim 15 wherein the slot and said recess are rectangular in cross-section.

18. A device according to claim 15 wherein said strip is spring steel and is secured, at a selected point along its length to said slot.

19. A device according to claim 15 wherein said strip is substantially the same length as said slot.

20. A device according to claim 15 wherein the upper surface of said strip and the upper surface of said washer are co-planar, or nearly so.

21. A device for use in a fastener assembly to monitor tension therein, said fastener assembly being of the type including a stationary member such as a bolt and a moveable member such as a nut threadably engaging said bolt for securing structural elements or the like between said nut and bolt;

said tension monitoring device comprising:
a washer for location in said fastener assembly between either said stationary bolt or the moveable nut and said structural elements;
a radially extending slot of rectangular cross-section formed in one surface of said washer and extending substantially the surface of the washer from the inner to the outer periphery thereof;
a recess of rectangular cross-section in the bottom of the slot, said recess having end surfaces the upper ends of which meet the bottom surface of said slot to form a fulcrum point at the junction between the slot bottom and said end surfaces; and a metal monitor strip located in said slot and being secured, at a selected point along its length, to said slot such that the distal end, at least, of the strip sits freely in said slot whereby, when sufficient tension between the adjacent fastener member and the structural element is applied, a portion of said strip in said slot will be forced into said recess and the strip will pivot about said fulcrum so that the distal end of the strip will rise from the slot to provide a visual display of said tension.

22. A device according to claim 21 wherein the upper surface of said strip and the upper surface of said washer are co-planar, or nearly so.

23. A device according to claim 21 wherein said strip is substantially the same length as said slot.

24. A device to monitor tension in the members of a fastener assembly such as a stationary member and a moveable member for securing structural elements or the like therebetween, said device comprising a washer for location in the assembly between the moveable member and the elements or between the stationary member and the elements; a tension monitor strip located on the surface of said washer such that a portion of the length of the strip is positioned under one of said members; and a fulcrum on said one of said members for engaging said strip so that, under pressure from the fulcrum on said one of said members, the distal end of said strip will rise to provide an indication of tension in said assembly.

25. A device according to claim 24 wherein the stationary member is a bolt and the moveable member is a nut and wherein said one of said members is a nut.

26. A device according to claim 24 wherein said one of said members is a nut and the fulcrum comprises an annular rib depending from the underside of said nut for engaging and activating the monitor strip on the surface of said washer.

27. A device to monitor tension in the members of a fastener assembly such as a stationary bolt and a moveable nut for securing structural elements or the like there between, said device comprising a washer for location in the assembly between the nut and the elements or between the bolt head and the elements; a slot, in the surface of the washer extending radially outwardly from the inner periphery thereof; a vertical tab at the proximal end of the slot; a recess in the bottom of the slot forming at least one fulcrum point in the slot between the bottom recess and the bottom of the slot; and a monitor strip located in the slot such that a portion of the length of the strip is located under a member of said fastener assembly so that, under predetermined tension from one of the fastener assembly members, the distal end of the strip rises from the slot to provide a visual and measurable monitor of tension in the assembly.

28. A device for use in a fastener assembly to monitor tension therein, said fastener assembly being of the type including a stationary member such as a bolt and a moveable member such as a nut threadably engaging said bolt for securing structural elements or the like between said nut and bolt;

said tension monitoring device comprising:
(a) a washer for location in said fastener assembly between either said stationary bolt or the moveable nut and said structural elements;
(b) a radially extending slot in one surface of said washer and extending substantially the surface of the washer from the inner to outer periphery thereof;
(c) said slot having a vertical tab at the proximal end thereof;
(d) a recess in the bottom of the slot, said recess having end surfaces the upper ends of which meet the bottom surface of said slot to form a fulcrum point at the junction between the slot bottom and said end surfaces; and
(e) a monitor strip located in said slot such that the distal end, at least, of the strip sits freely in said slot whereby, when sufficient tension between the adjacent member and the structural element is applied, a portion of said strip will be forced into said recess and the strip will pivot about said fulcrum so that the distal end of the strip will rise from the slot to provide a visual display of said tension.

29. A device for use in a fastener assembly to monitor tension therein, said fastener assembly being of the type including a stationary member such as a bolt and a moveable member such as a nut threadably engaging said bolt for securing structural elements or the like between said nut and bolt;

said tension monitoring device comprising:
(a) a washer for location in said fastener assembly between either said stationary bolt or the moveable nut and said structural elements;
(b) a radially extending slot of rectangular cross-section formed in one surface of said washer and extending substantially the surface of the washer from the inner to the outer periphery thereof;
(c) said slot having a vertical tab at the proximal end thereof;
(d) a recess of rectangular cross-section in the bottom of the slot, said recess having end surfaces the upper ends of which meet the bottom surface of said slot to form a fulcrum point at the junction between the slot bottom and the end surfaces; and
(e) a metal monitor strip located in said slot and being secured, at a selected point along its length, to said slot such that the distal end, at least, of the strip sits freely in said slot whereby, when sufficient tension between the adjacent fastener member and the structural element is applied, a portion of said strip in said slot will be forced into said recess and the strip will pivot about said fulcrum so that the distal end of the strip will rise from the slot to provide a visual display of said tension.

* * * * *